United States Patent [19]

Irons

[11] 4,046,691
[45] Sept. 6, 1977

[54] METHOD FOR COLLECTING LIGHT-WEIGHT SUBSTANCE FLOATING ON A LIQUID SURFACE

[75] Inventor: Eric Irons, East Hadden, England

[73] Assignee: Ballast-Nedam Groep, N.V., Amstelveen, Netherlands

[21] Appl. No.: 680,449

[22] Filed: Apr. 26, 1976

Related U.S. Application Data

[63] Continuation of Ser. No. 545,552, Jan. 30, 1975, abandoned.

[30] Foreign Application Priority Data

Feb. 25, 1974 United Kingdom ............ 9211/74
Aug. 23, 1974 Netherlands ............ 7411232

[51] Int. Cl.² .......................................... E02B 15/04
[52] U.S. Cl. .................... 210/83; 210/DIG. 25; 210/242 R
[58] Field of Search ............ 210/84, 169, 207, 242 R, 210/242 S, 258, 538, 540, DIG. 25, 83

[56] References Cited

U.S. PATENT DOCUMENTS

| 3,476,246 | 11/1969 | Dahan | 210/DIG. 25 |
| 3,724,662 | 4/1973 | Ortiz | 210/242 S |
| 3,800,951 | 4/1974 | Mourlon et al. | 210/242 S |
| 3,812,968 | 5/1974 | Aramaki et al. | 210/242 S |
| 3,853,768 | 12/1974 | Bagnulo | 210/242 S |
| 3,890,234 | 6/1975 | Galicia | 210/242 S |

FOREIGN PATENT DOCUMENTS

| 1,467,773 | 1/1967 | France | 210/242 S |

*Primary Examiner*—Theodore A. Granger
*Attorney, Agent, or Firm*—Snyder, Brown & Ramik

[57] ABSTRACT

Method of collecting light-weight substance floating on a liquid surface, for example, oil floating on water, said light-weight substance being carried into a collecting reservoir, in that on the outer side of a wall of the collecting reservoir extending below the liquid surface, away from the liquid surface, a down-stream is produced by which the light-weight substance with liquid is passed beneath an edge of the wall located beneath the liquid surface and into the collecting reservoir, after which the light-weight substance rises up in the reservoir to the liquid surface, where it is collected, while the liquid is conducted away through at least one outlet near the bottom side of the collecting reservoir.

3 Claims, 7 Drawing Figures

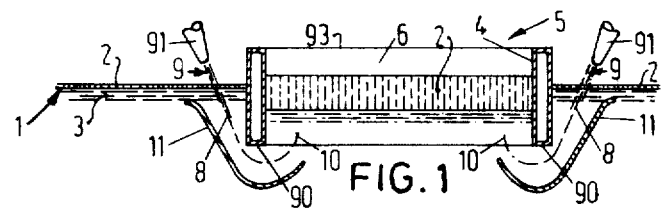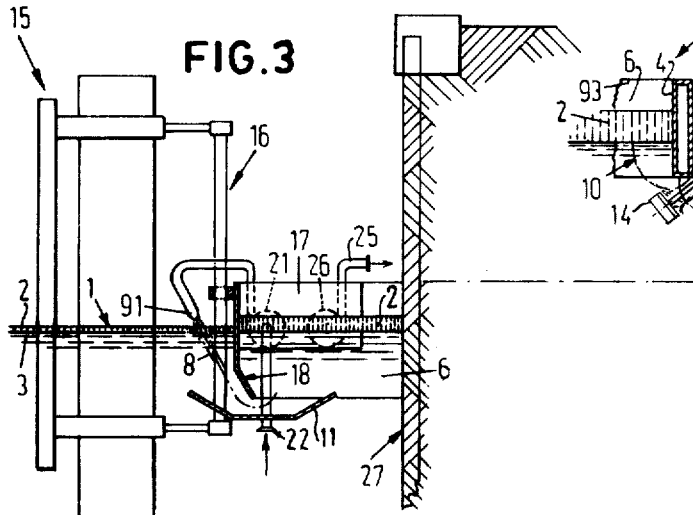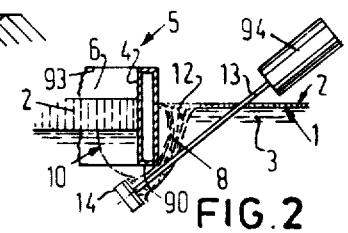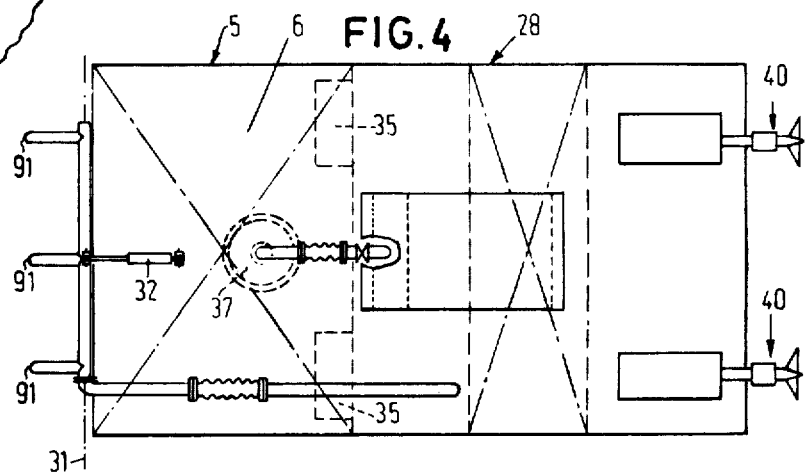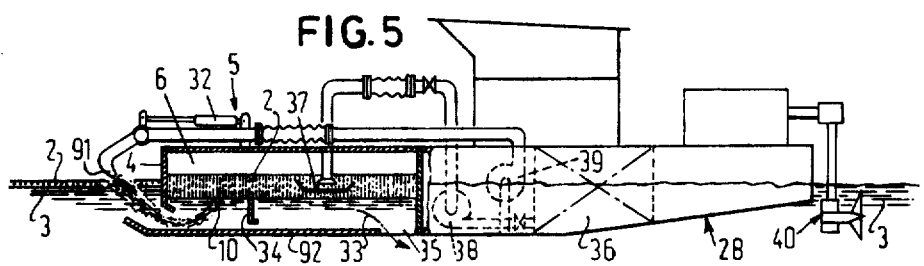

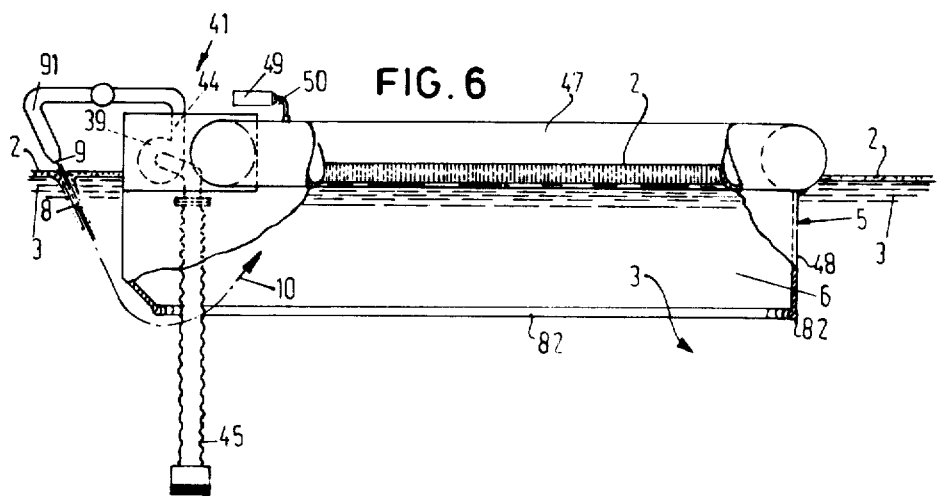
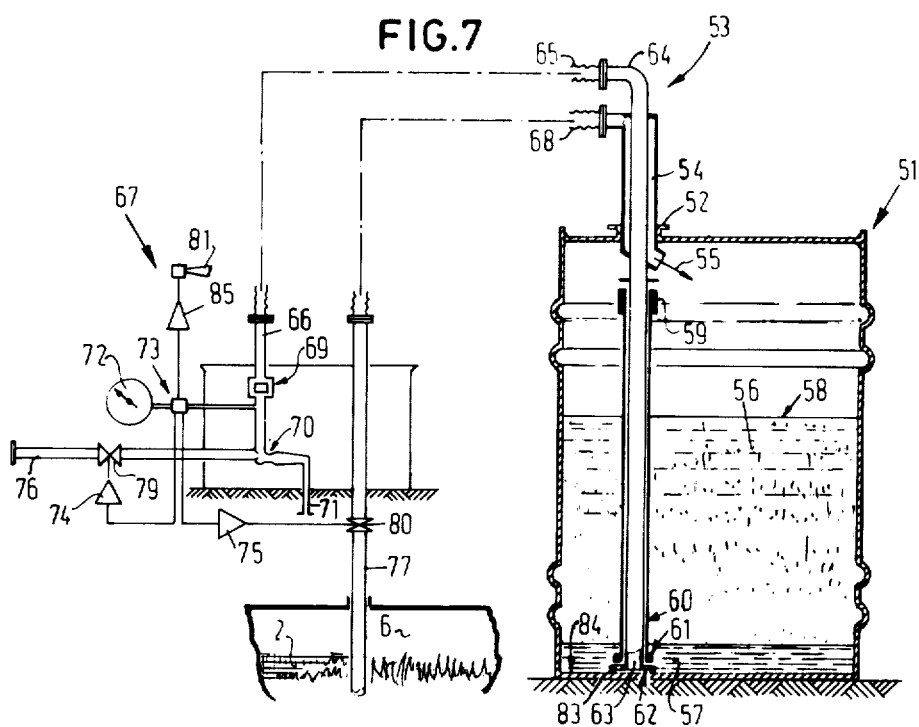

METHOD FOR COLLECTING LIGHT-WEIGHT SUBSTANCE FLOATING ON A LIQUID SURFACE

This is a continuation of application Ser. No. 545,552 filed Jan. 30, 1975, now abandoned.

This invention relates to a method for collecting at least one light-weight substance floating on an liquid surface, for example, oil floating on water, said substance being carried into a collecting reservoir, at least one of the downwardly extending walls of which extends beneath the liquid surface.

Such a method and device are know.

In the known device the light-weight substance floating on the liquid surface, for example, vegetable debris, oil or similar impurities is "stripped off" the liquid surface.

Since it is not possible to accurately follow the thickness of the layer, a fairly large quantity of light-weight substance is left on the liquid surface.

Moreover, the impurities will not flow automatically towards the stripping device; on the contrary, the device has to be moved towards the impurities or mechanical feeders have to be employed.

Particularly in removing oil patches from water the floating mass is mechanically stirred, which involves the risk of rupture of the natural cohesion of the light-weight substance so that one patch after the other will not automatically follow the stream.

The invention provides an improved method in that at least on the outer side of the wall extending beneath the liquid surface at least one down-stream is produced from the liquid surface, which stream carries the light-weight substance together with liquid below an immersed edge of the wall and into the interior of the collecting reservoir, the light-weight substance then rising to the liquid surface in the reservoir, where it is collected, whilst the liquid is conducted away through at least one outlet near the bottom of the collecting reservoir.

A particularly effective method in accordance with the invention is characterized in that the down-stream is produced by a fluid jet directed from above to the liquid surface.

The device employed for carrying out the method embodying the invention is characterized by a collecting reservoir for the light-weight substance to be removed, at least one of the downwardly extending walls of which reservoir extends into the liquid, by means for producing at least one down-stream from the liquid surface for carrying the light-weight substance below an immersed edge of said wall and into the collecting reservoir and by at least one outlet of the collecting reservoir for conducting liquid away.

The above-mentioned and further features of the invention will be further explained in the following description with reference to the drawing.

The drawing shows schematically in FIG. 1 a vertical sectional view of a preferred embodiment of the device in accordance with the invention, in FIG. 2 a partial, vertical sectional view of a further embodiment of the device in accordance with the invention, in which a mechanically produced vortex is employed, in FIG. 3 a vertical sectional view of an oil collector employed at a landing-stage, in FIGS. 4 and 5 a plan view and a side elevation respectively of a further development of the device embodying the invention, in FIG. 6 a side elevation of a still further development of the device in accordance with the invention, and in FIG. 7 a device for filling oil drums by a further developed construction of the device in accordance with the invention.

The figures show a light-weight substance 2 floating on a liquid surface 1. Hollow walls 4 of a collecting reservoir 5 inserted into the liquid 3 separate the collecting space 6 from the surrounding space 7.

The impurity 2 may be foam, vegetable debris, sawdust or similar solid substance and/or crude or light oil floating, for example, on water.

As shown in FIG. 1, a down-stream 8 is produced at several areas by directing at least one jet 9 from a nozzle 91 to the liquid surface 1 and the impurities 2 floating thereon in a predetermined direction with sufficient energy to ensure that in dependence upon the viscosity and the specific weight the impurities 2 to be carried along by jet 9 are transported at least mainly below and beyond an edge 90 of a wall 4 and into the collecting reservoir 5, where the light-weight substance 2, owing to its rising power, gets into an up-stream 10 and flows into the collecting space 6.

The liquid carried along 3 as well as the liquid supplanted by the impurities 2 from the collecting space 6 can escape through the open bottom 92 of the collecting reservoir 5.

The air carried along from the atmosphere by the injection of the jet 9 also rises together with the impurities 2 up into the collecting space 6 and escapes at the open top side 93.

In order to avoid an excessive need for energy due to the displacement of an excessive quantity of ambient liquid in the area of the jet 9 a stream guide 11 may be provided. FIG. 2 shows a preferred embodiment of the invention, in which the down-stream 8 is produced by means of a vortex 12 generated by a rotor 14 adapted to rotate with high speed about a shaft 13 arranged below in the collecting reservoir 5. The rotor 14 is formed by a round disc driven by a motor 94.

The direction of the shaft 13 and the circumferential speed of the rotor 14 are chosen so that the down-stream 8 with the impurities 2 gets inside the collecting reservoir 5.

FIG. 3 illustrates a preferred form of the method embodying the invention carried out by means of a preferred embodiment of the device in accordance with the invention for removing, for example, oil spilt during ship loading operations on the water 3. For this purpose a guided 16 is provided on a landing-stage 15 for allowing a pontoon 17 to follow the tidal movements. The pontoon 17 is provided with walls 18 enclosing a collecting space 6 with the quay-wall 27. With the aid of a pump 21 arranged on the pontoon 17, via an inlet 22, water 3 can be sucked in and be directed by a nozzle 91 to the soiled water surface 1. The oil 2 is collected in the collecting space 6 and can be conveyed through an outlet 25 by a pump 26 to a tank (not shown). Above the inlet 22 a stream guide 11 is provided.

FIGS. 4 and 5 show a prefered embodiment of the device in accordance with the invention, in which a floating collecting reservoir 5 is employed, which is useful in removing oil 2 from water 3 on navigation routes.

In a hull 28 a collecting reservoir 5 having a collecting space 6 is provided, the front side thereof having a wall 4 extending down into the water 3.

Three nozzles 91 are adaped to be turned about an axial line 31 with respect to the hull 28 by means of a jackscrew 32 in dependence upon the impurity 2 to be removed.

A partition 34, open on the bottom side, guides the up-stream 10 on one side and the water outlet stream 33 on the other side. The bottom 92 has outlets 35 for the water.

The oil 2 accumulated in the collecting space 6 can be stored by means of a suction device 37 and a pump 38 in a storing space 36. A controllable pump 39 feeds water to the nozzles 91. For the propulsion of the hull 28 drives 40 are provided.

For removing large oil patches caused by calamities in open water 3 FIG. 6 shows a preferred embodiment of the device in accordance with the invention, which may be dropped, for example, from an aircraft. A pontoon 41 has a stationary wall 4 and is provided with a plurality of nozzles 91 fed via a pump 39 and a strengthened, deeply immersed hose 45.

The collecting reservoir 5 comprises inflatable floating chambers 47 and integral, flexible walls 48 suspending therefrom and connected with the stationary wall 4 and strengthened by weights 82.

An air flask 49 with an automatically controlled valve 50 provides the required floating capacity and the required stiffness of the floating chambers 47. In this way the collecting reservoir 5 may be very large: for example, it may have a capacity of several thousands of cubic meters.

FIG. 7 shows a device for loading standard oil drums. An oil drum 51 is filled by means of the loading device 53 to be inserted through the bung-hole 52. The loading device 53 comprises a feeder tube 54 for the oil supplied from the collecting space 6, which unavoidably carries along a quantity of water. The oil travels in the direction of the arrow 55 and accumulates in the form of a layer 56 in the drum 51. The water carried along settles down in the form of a layer 57. As soon as the liquid level 58 of oil touches the floats 59, flaps 61 are lifted via the sleeve 60 so that the openings 62 in the suction chambers 63 are released, which suction chambers 63 join the bottom of the drum 84 by means of a sealing ring 83. The water of the layer 57 then flows into the suction chamber 63 and is conducted via the rising tube 64 and the hose 65 to the water outlet channel 66 of the drum loader 67. The oil hose 68 establishes in a similar manner a communication between the drum loader 67 and the feeder tube 54. In the drum loader 67 the water passes through a viscosity-sensitive flap 69 and is subsequently conducted away via the jet pump 70 and the outlet duct 71. As soon as a liquid having a viscosity differing from that of water passes through the flap 69, this flap is closed. The manometer 72 then indicates a different pressure than hitherto. A pressure pick-up 73 generates a signal for amplifiers 74, 75 and 85, which then bring about the closure of the shutters 79 and 80 and actuate an alarm device 81. The supply of energy 76 and the oil supply 77 are thus cut off. The full drum has then to be replaced by an empty one.

What is claimed is:

1. The method of collecting oil floating on the surface of a body of water, comprising the steps of:
   a. providing an enclosure with an open bottom and side walls extending from a depth below the interface between the oil and water to above the surface of the body of water;
   b. locating a nozzle above the surface of said body of water outside of and spaced from said side walls and downwardly directed for directing water from said nozzle to a location beneath the open bottom of said enclosure;
   c. directing a stream of water from said nozzle through the oil on the surface of said body of water whereby said oil is displaced to a location beneath the open bottom of said enclosure and thereafter rises to the surface of the water within said enclosure; and
   d. removing the oil from the surface of the water within said enclosure.

2. The method as defined in claim 1 wherein the enclosure is provided by inflating an inflatable trunk having depending flexible skirt means attached thereto.

3. The method as defined in claim 2 wherein said inflatable trunk carries a pump having a flexible suction hose connected to its inlet and depending to a level below said skirt, said pump having its outlet connected to said nozzle, and the water directed in step (c) being effected by operating said pump.

* * * * *